C. MÜLLER.
FILTERING DEVICE.
APPLICATION FILED MAR. 23, 1908.
932,408.
Patented Aug. 24, 1909.
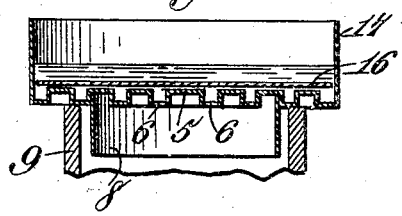
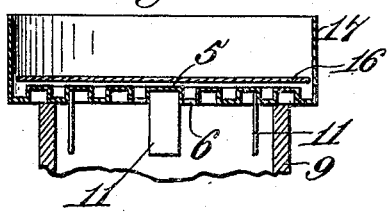
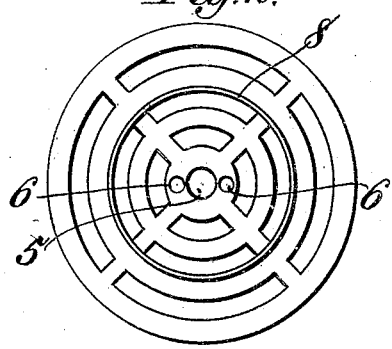
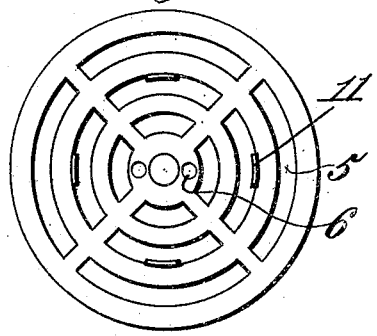
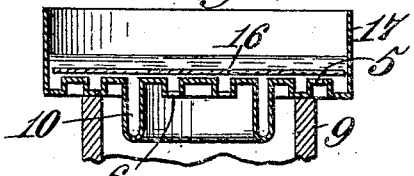
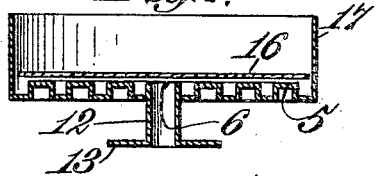
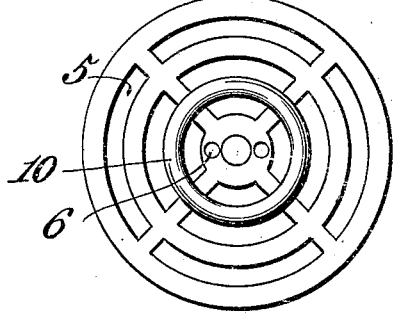
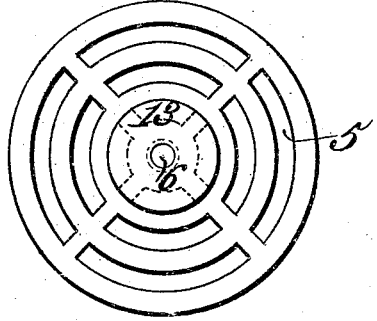
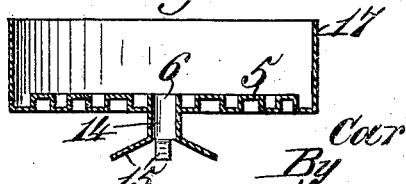
Witnesses.
Robert Errett.
Inventor.
Carl Müller.
By James L. Norris.
Atty.

UNITED STATES PATENT OFFICE.

CARL MÜLLER, OF DRESDEN, GERMANY.

FILTERING DEVICE.

932,408.  Specification of Letters Patent.  Patented Aug. 24, 1909.

Application filed March 23, 1908. Serial No. 422,829.

*To all whom it may concern:*

Be it known that I, CARL MÜLLER, a subject of the Emperor of Germany, residing at Dresden, Germany, have invented certain new and useful Improvements in Filtering Devices, of which the following is a specification.

This invention relates to a filtering vessel adapted to be placed on the top of a receptacle to receive the filtered liquid, and consists essentially in providing extensions on the under side of the bottom of the filter, by means of which the latter is maintained in position on the receptacle and prevented from falling or becoming displaced from the said receptacle while in use.

The filter or filtering vessel has a grooved or corrugated bottom on which the filtering paper or other material is disposed. The extensions also on the bottom of the vessel and used for increasing the stability of the filter may be in the form of a single depending flange or in the form of a plurality of downward extensions and may be constructed integrally with the bottom or attached to the latter and in some instances have a special discharge pipe feature.

In the drawing:—Figure 1 is a transverse sectional view through one form of the filter or filtering vessel and a portion of the receptacle. Fig. 2 is a bottom plan view of the filter or filtering vessel shown by Fig. 1. Fig. 3 is a view similar to Fig. 1, showing a slight modification. Fig. 4 is a bottom plan view of the filter or filtering vessel shown by Fig. 3. Fig. 5 is a view similar to Figs. 1 and 3, showing a further modification of the filter or filtering vessel. Fig. 6 is a bottom plan view of the filter or filtering vessel shown by Fig. 5. Fig. 7 is a transverse vertical section through a still further modified form of the filter or filtering vessel. Fig. 8 is a bottom plan view of the filter or filtering vessel shown by Fig. 7. Fig. 9 is a transverse vertical section through a still further modified form of the filter or filtering vessel.

In all the forms of the filter shown, the bottom 5 is corrugated and has one or more outlet openings 6, the corrugations communicating by cross passages with one or more openings so as to drain or outlet the filtered liquid from the corrugations.

In the form of the device shown by Figs. 1 and 2, a flange 8 depends from the bottom 5 and acts as a guard to prevent displacement of the filter or filtering vessel from the receptacle 9, for instance, on which it may be disposed. This flange 8 is continuous or concentric with relation to the center of the bottom of the filter and consists of a strip of metal or other suitable material fixedly secured to the bottom 5 and may depend below the latter any preferred distance.

In the form of device shown by Figs. 3 and 4, a hollow guard 10 is provided which opens through the bottom and is formed as a part of the latter.

In the form of device shown by Figs. 5 and 6, these projections 11 depend at intervals from the bottom and serve as guards and thus it will be seen that the bottom may have various forms of extensions either in single or plural number. As shown by Figs. 7 and 8, the bottom 5 has a single discharge opening 6 at the center, with which a depending pipe or tube 12 connects and is formed with a lower terminal flange 13 which will be of such diameter or horizontal extent as to strike the receptacle on which the filter is placed and prevent falling of the filter from its applied position.

In the form of device shown by Fig. 9 the central outlet opening 6 is also provided in the bottom 5 and has a depending discharge pipe or tube 14 similar to the discharge pipe 12 shown by Fig. 7, and projecting downwardly and outwardly from the lower end of the discharge pipe 14 are a plurality of guards 15, the flange 13 as shown by Fig. 7 also serving as a guard. It will thus be seen that the guards may be varied, but all perform a similar function and contribute to the effectiveness of the filter or filtering vessel.
Whatever may be the contour of the bottom of the filter or filtering vessel filtering material 16 preferably in sheet form is placed thereover, the body 17 of the filter or filtering vessel being of any depth desired and serving to receive the liquid to be filtered, which liquid is poured thereinto and passes through the filtering material 16 into the corrugations of the bottom 5 and from the corrugations escapes through the one or more outlet openings 6 into the receptacle on which the filter is disposed.

The filter or filtering vessel may be readily cleaned and will be found exceptionally convenient for the purpose to which it has been devised.

What is claimed is:—

1. A filtering vessel having a bottom formed with a plurality of concentric circularly disposed corrugations provided with radial communicating passages, the said bottom having one or more outlets at the center, and guard means depending from the bottom and loosely projectable into a receptacle on which the filtering vessel is disposed to prevent displacement of the said vessel.

2. A filtering vessel having a bottom formed with a plurality of concentric circularly disposed corrugations provided with radial communicating passages, the said bottom having one or more outlets at the center, guard means depending from the bottom around the one or more outlets for holding the vessel in place on the inlet portion of a receptacle, and a filtering sheet loosely applied within the vessel on the corrugations.

3. A filtering vessel having a bottom formed with a plurality of concentric circularly disposed corrugations provided with radial communicating passages and a central outlet opening, and a discharge pipe applied over said outlet opening and depending below the bottom and provided with outwardly projecting guard means at its lower extremity to prevent displacement of the vessel when in applied position.

In witness whereof I have hereunto set my hand in presence of two witnesses.

CARL MÜLLER.

Witnesses:
 CURT WITTING,
 PAUL ARRAS.